(12) United States Patent
Caveney et al.

(10) Patent No.: US 6,698,069 B2
(45) Date of Patent: Mar. 2, 2004

(54) LOW PROFILE CABLE TIE WITH PREBENT STRAP

(75) Inventors: Jack E. Caveney, Hinsdale, IL (US);
Robert J. Krisel, Oak Forest, IL (US);
James A. Brownlee, Park Forest, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 10/395,448

(22) Filed: Mar. 24, 2003

(65) Prior Publication Data

US 2003/0177613 A1 Sep. 25, 2003

Related U.S. Application Data

(62) Division of application No. 09/855,414, filed on May 15, 2001, now Pat. No. 6,560,822.

(51) Int. Cl.[7] ............................................. B65D 63/14
(52) U.S. Cl. ................. 24/16 PB; 24/17 AP; 24/305 P; 164/303; 425/130; 425/131.1; 425/133.1
(58) Field of Search ......................... 24/16 PB, 17 AP, 24/30.5 P; 248/74.3; 411/437; 164/303; 425/130, 131.1, 133.1

(56) References Cited

U.S. PATENT DOCUMENTS

| | | | | |
|---|---|---|---|---|
| 3,408,699 A | * | 11/1968 | Reynolds | 24/16 PB |
| 3,875,618 A | * | 4/1975 | Schuplin | 24/16 PB |
| 5,517,727 A | * | 5/1996 | Bernard et al. | 24/16 PB |
| 5,621,949 A | * | 4/1997 | Wells et al. | 24/16 PB |
| 5,630,252 A | * | 5/1997 | Wells | 24/16 PB |
| 5,774,944 A | * | 7/1998 | Choi | 24/16 PB |
| 5,781,975 A | * | 7/1998 | Wells, Jr. et al. | 24/16 PB |
| 5,815,891 A | * | 10/1998 | Students et al. | 24/16 PB |
| 6,279,203 B1 | * | 8/2001 | Hundley et al. | 24/16 PB |

* cited by examiner

Primary Examiner—Victor Sakran
(74) Attorney, Agent, or Firm—Robert A. McCann; Jay A. Saltzman; Christopher S. Clancy

(57) ABSTRACT

A low profile cable tie, preferably a two-piece cable tie, has a low profile locking head with a lateral strap accepting channel and a strap preferably molded with a right angle bend that is retained in this state during non-use. The cable tie has a clean exterior appearance, including a top surface free of openings and a smooth lateral opening. With this cable tie, a strap accepting channel is provided in the locking head that is substantially parallel to a strap attachment axis. The strap accepting channel divides the locking head into a first part, which is secured to the strap, and a second part which contains a locking device. By providing the locking device on the second part, the first part can be made thinner, allowing the strap accepting channel to be closer to the cable bundle being tied. Further, in the case of a two-piece cable tie having a metal locking device, the locking device is preferably bent so as to have a fixed end substantially parallel to the strap accepting channel axis and a free end positioned within the strap accepting channel at an acute angle relative to the strap accepting channel axis. A bottom wall may be shorter in length than an upper wall to define a recessed inset that widens the effective strap accepting channel entrance without increasing the height of the locking head. The inset also allows entrance of the strap over a broader range of entrance angles.

7 Claims, 5 Drawing Sheets

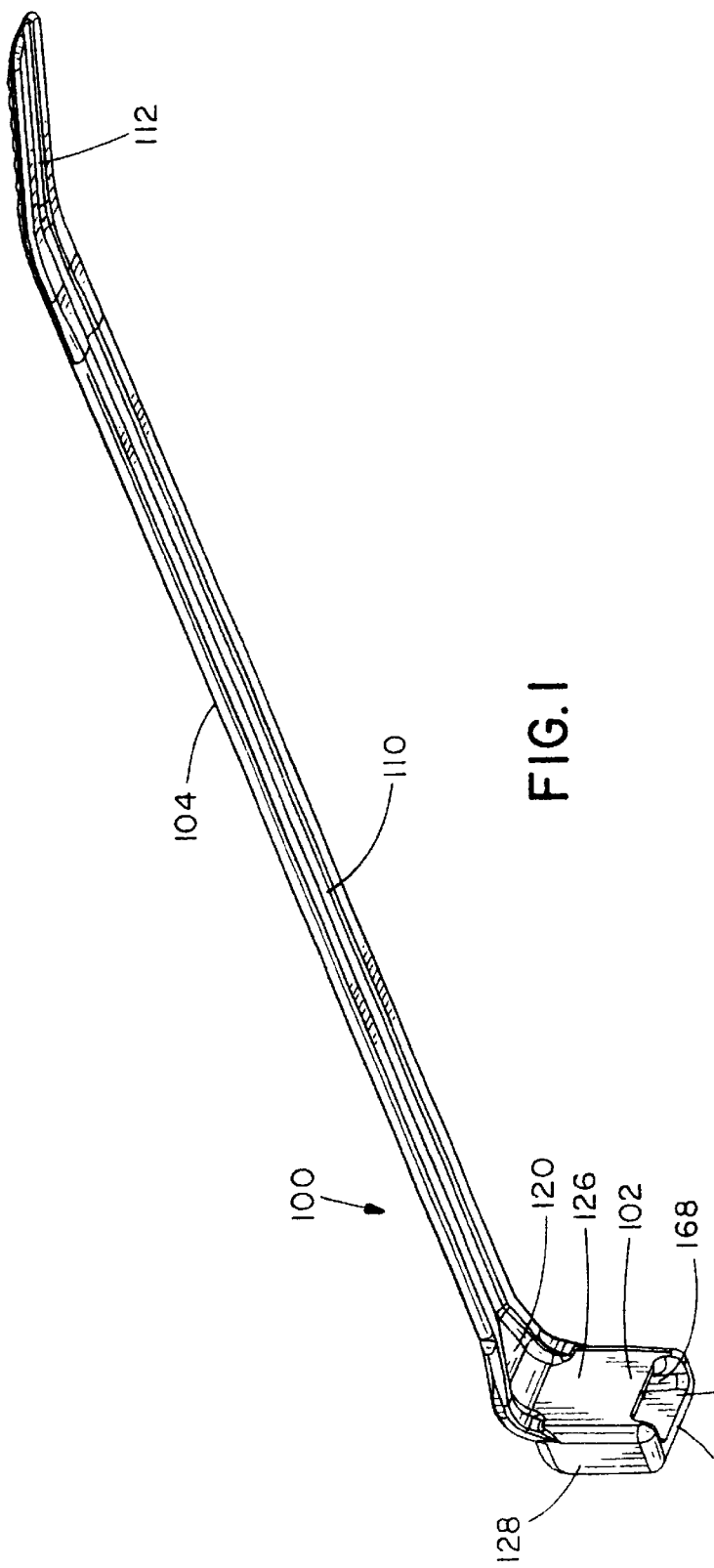
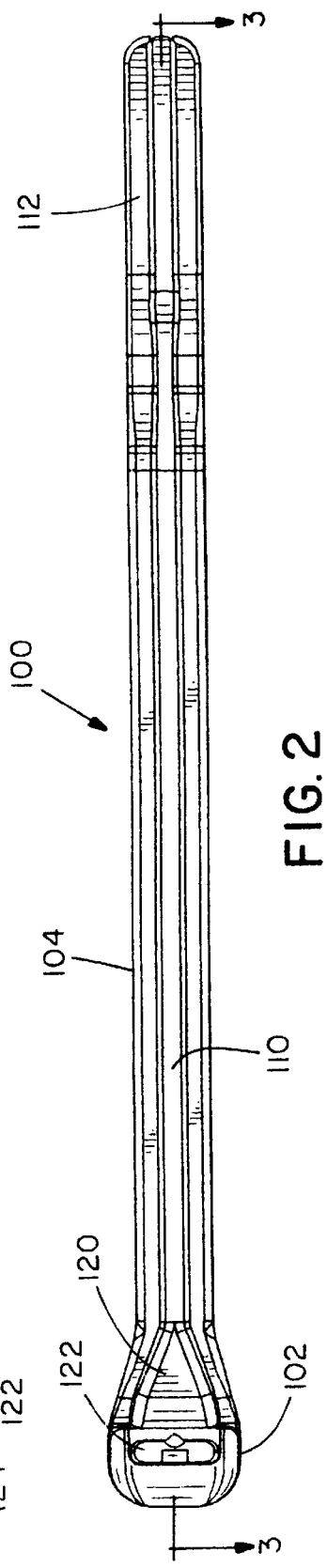

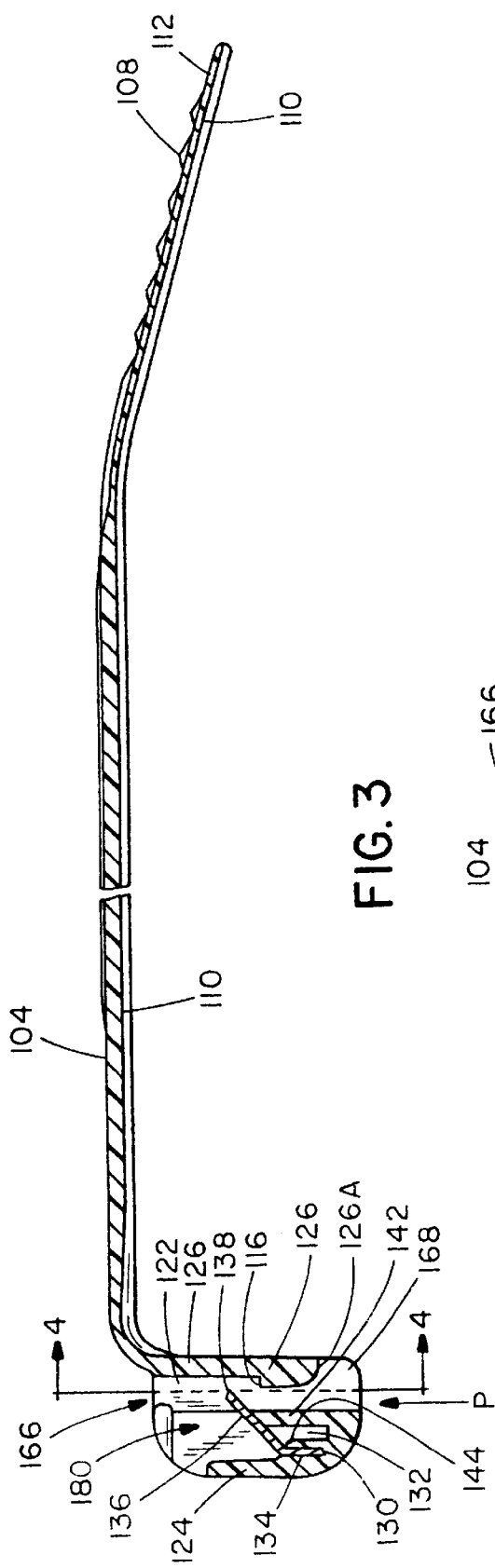
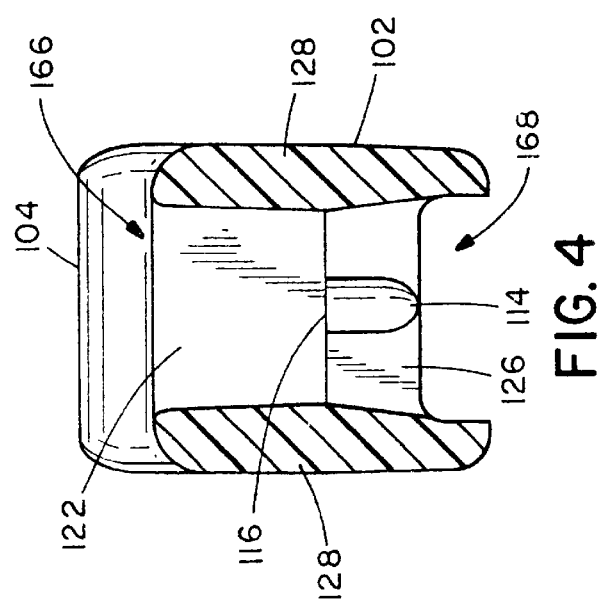

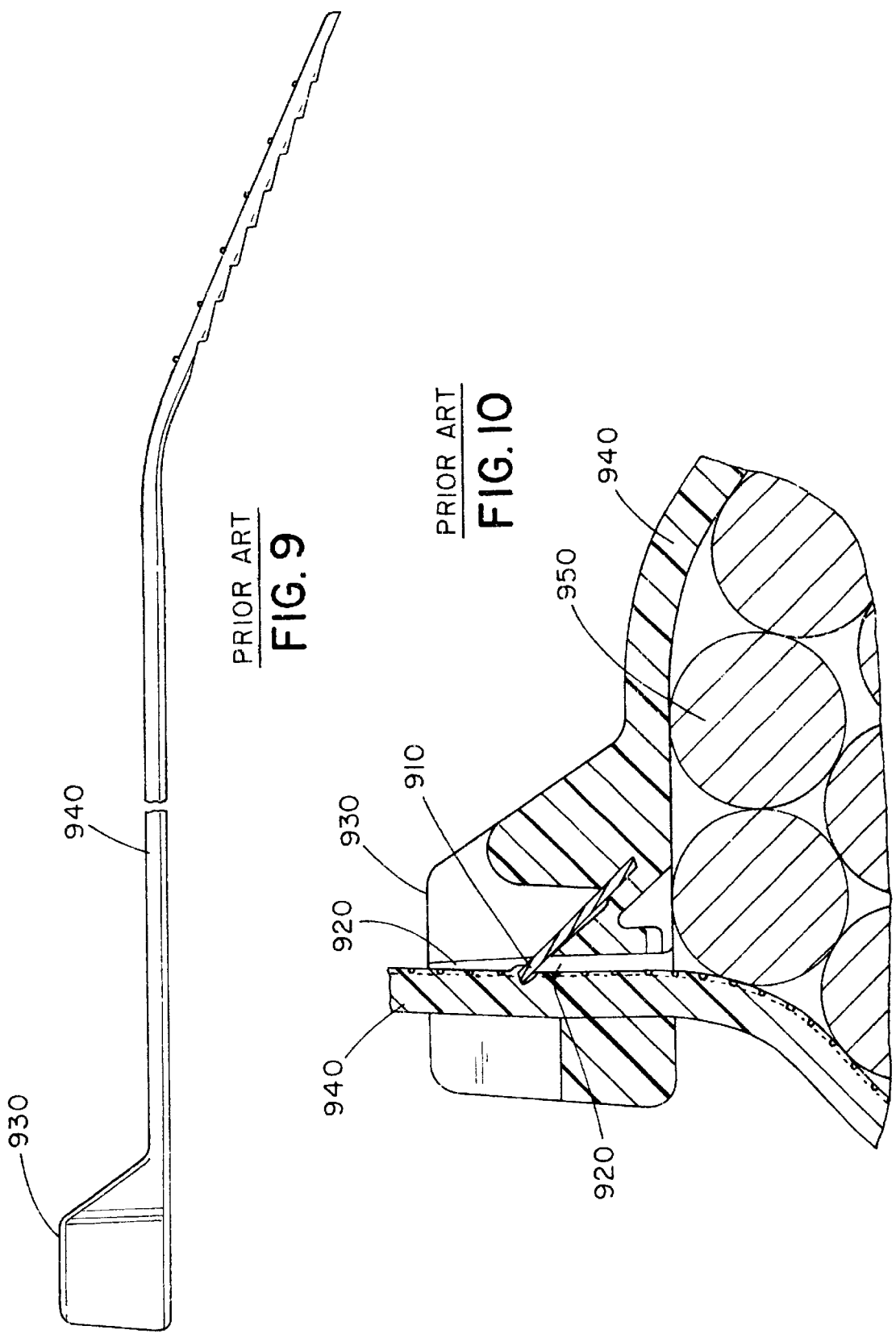

LOW PROFILE CABLE TIE WITH PREBENT STRAP

CROSS-REFERENCE TO RELATED APPLICATIONS

This application is a divisional of application Ser. No. 09/855,414, filed May 15, 2001 now U.S. Pat. No. 6,560,822.

BACKGROUND OF THE INVENTION

1. Field of Invention

The present invention relates generally to a low profile cable tie with a bent cable strap. More particularly, the invention relates to a two-piece cable tie with a lateral strap accepting channel in the cable tie head and a prebent right angle strap attached thereto.

2. Description of Related Art

Plastic cable ties, and in particular plastic cable ties having metal locking device inserts, are well known in the art. Examples of such include U.S. Pat. No. 3,457,598 to Mariani and U.S. Pat. No. 5,517,727 to Bernard et al.

Cable ties of this type, referred to as two-piece cable ties, are generally illustrated by FIGS. 9 and 10 and include a metal locking device 910 partially embedded at an angle within a strap accepting channel 920 of a cable tie head 930. The metal locking device 910 is situated at an angle that allows insertion of a cable tie strap 940 in an insertion direction, but allows for engagement of the locking device 910 with the strap when it is pulled in a removing direction to prevent removal. The metal locking device of such conventional cable ties is in the form of a cantilevered beam that is fixed at one end and extends into the strap accepting channel at the free end.

As shown in FIG. 10, these conventional two-piece cable ties have a strap accepting channel perpendicular to a longitudinal axis of the head. That is, the channel exits a top surface of the cable tie head as shown. In such designs, the large open space on the top surface of the cable head necessary to enable insertion of the metal locking device makes the appearance unclean. Also, when bundling a cable bundle 950, the conventional two-piece cable tie may interfere more with other cable bundles or objects because the head of the cable tie extends too far beyond the cable bundle periphery (i.e., to the left and above the cable bundle as shown in FIG. 10).

There is a need for an improved two-piece cable tie that has a lower profile.

There is a further need for a cable tie having a clean, aesthetic exterior appearance.

There is yet a further need for a two-piece cable tie that can achieve a reduced installation size to minimize space constraints for the tie. That is, a reduction in height and width attainable when installed on a cable bundle.

SUMMARY OF THE INVENTION

It is an object of the invention to provide a two-piece cable tie having a low profile locking head with a lateral strap accepting channel and a prebent right angle strap.

It is another object of the invention to provide a two-piece cable tie having a clean exterior appearance, including a top surface free of openings and a smooth lateral opening.

It is a further object of the invention to provide a two-piece cable tie with a strap accepting channel that extends tangential to a cable bundle and is nearer the cable bundle when installed.

It is yet a further object of the invention to provide a two-piece cable tie having a low profile locking head with a lateral strap accepting channel and a prebent right angle strap attached thereto.

It is yet another object of the invention to provide a cable tie with a strap accepting channel parallel to a longitudinal axis of the head while having an entrance channel that can accommodate insertion of a strap end over a greater angular range and accommodate the width of the strap to minimize overall cable tie dimensions during use.

One or more of the above and other objects are achieved by a low profile cable tie, comprising: a strap having a predetermined thickness and including a first end that is molded with a right angle bend and a free end; a locking head including a strap accepting channel in the head that divides the locking head into a first part and a second part, the strap accepting channel having a strap entry end and a strap exit end on opposite ends of a strap accepting channel axis, the first part of the locking head being secured to the first end of the strap along a strap attachment axis which is substantially parallel with the strap accepting channel axis, the locking head further including a locking device receiving cavity located on the second part adjacent to and open toward the strap exit end of the locking head; and a locking device mounted within the locking device receiving, the locking device including a free end angled at an acute angle relative to the strap accepting channel axis and extending into the strap accepting channel. A top surface of the locking head is provided immediately adjacent the locking device and has a thickness extending above the locking device that is no more than the thickness of the strap and where the first part has a thickness that is no more than the thickness of the strap. The locking device is preferably a metal locking device.

One or more of the above and other objects of the invention may also be achieved by a low profile cable tie, comprising: a strap having a predetermined thickness and including a first end and a free end; a locking head including a strap accepting channel in the head that divides the locking head into a first part and a second part, the strap accepting channel having a strap entry end and a strap exit end on opposite ends of a strap accepting channel axis, the first part of the locking head being secured to the first end of the strap along a strap attachment axis which is substantially parallel with the strap accepting channel axis, the locking head further including a locking device receiving cavity located on the second part adjacent to and open toward the strap exit end of the locking head; and a metal locking device mounted within the locking device receiving cavity, the metal locking device being mounted within the locking device cavity by having a fixed end mounted to a mounting slot in an internal wall of the second part, the fixed end being oriented substantially parallel to the strap accepting channel axis, the metal locking device further including a bent free end angled at an acute angle relative to the strap accepting channel axis and extending into the strap accepting channel. The locking device is preferably a metal locking device.

One or more of the above and other objects may further be achieved by a method of forming a low profile cable tie, comprising the steps of: molding a cable tie strap with a predetermined thickness, the strap having a first end with a substantially right angle bend in a non-use state and a free end; forming a locking head secured to the first end of the strap, the locking head including a strap accepting channel having a strap entry end and a strap exit end aligned along a strap accepting channel axis, the strap accepting channel dividing the locking head into a first part and a second part, the first part of the locking head being secured to the first end of the strap along a strap attachment axis which is substantially parallel with the strap accepting channel axis, the locking head further including a locking device receiving cavity located in the second part of the locking head adjacent to and open toward the strap exit end of the locking head; forming a locking device with a fixable end and a free end that is angled at a predetermined acute angle relative to the fixed end; and providing the locking device in the locking device receiving cavity of the second part of the locking head so that the free end of the locking device extends into the strap accepting channel and the fixable end is securely fixed to the second part.

BRIEF DESCRIPTION OF THE DRAWINGS

The foregoing and further objects, features and advantages of the present invention will become apparent from the following description of preferred embodiments with reference to the accompanying drawings, wherein:

FIG. 1 is a bottom perspective view of a cable tie according to the present invention;

FIG. 2 is a bottom view of a cable tie according to the invention;

FIG. 3 is a cross-section view of the cable tie of FIG. 2 taken along line 3—3;

FIG. 4 is a cross-sectional view of a locking head of the cable tie of FIG. 3 taken along line 4—4;

FIG. 9 is a side view of a conventional two-piece cable tie; and

FIG. 10 is a cross-sectional view of a conventional two-piece cable tie locked in place around multiple cables.

DETAILED DESCRIPTION OF PREFERRED EMBODIMENTS

An inventive cable tie 100 will be described with reference to FIGS. 1–8. Cable tie 100 includes a locking head 102 and a strap 104. Cable tie 100 can be made from various materials as known in the art. Suitable materials include by way of example, nylon, polypropylene, and various fluoropolymers. Cable tie 100 can be formed in various sizes and lengths to suit a particular application as also known in the art. Obviously, desired loop tensile strength is one factor to decide when selecting sizing of the strap, locking head and other components.

Figure 8:
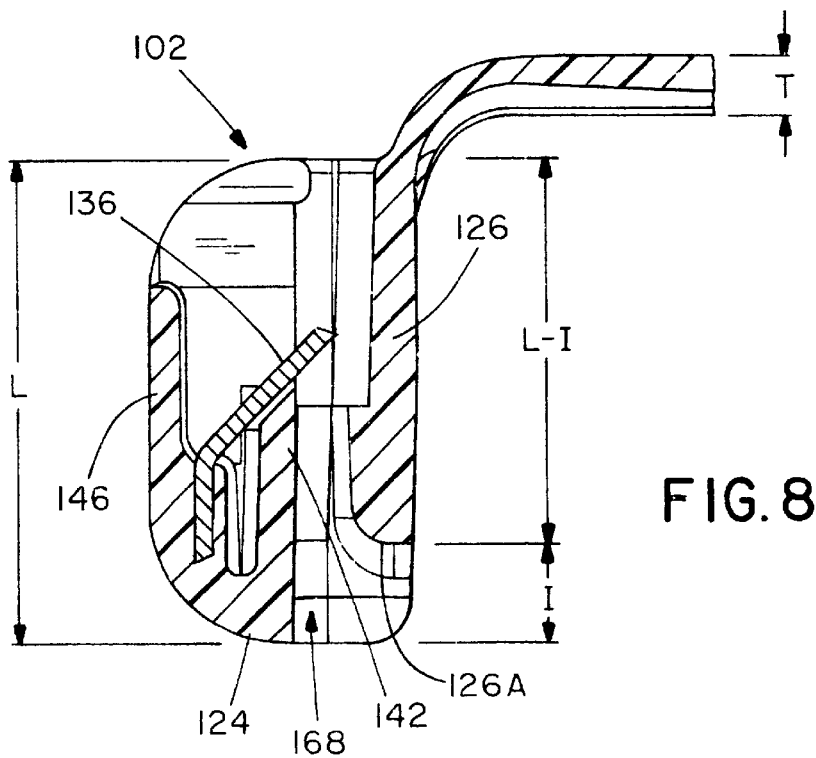
FIG. 8 is a partial cross-sectional view of the cable tie of FIG. 1 better showing details of the strap entrance.

Locking head 102 includes a strap accepting channel 122 and a locking device receiving cavity 180, both extending substantially parallel to a longitudinal axis P of locking head 102. Strap accepting channel 122 is provided to receive strap 104 and includes a strap entry end 168 through which strap 104 is first inserted and a strap exit end 166 (see FIG. 3) through which strap 104 exits. The strap entry and exit are oriented along axis P. As best shown in FIGS. 3–4, strap accepting channel 122 is formed by an end wall 124, a bottom wall (exterior wall) 126, and side walls 128. Strap accepting channel 122 has a predefined width sufficient to receive strap 104 and may be provided with a support guide 114 including a ledge 116 protruding from bottom wall 126. As best shown in FIG. 8, a leading edge 126A of bottom wall 126, in the region of the strap accepting channel 122, is inset from the full length L of locking head 102 by an inset distance I. As such, bottom wall 126 has a length L–I. Inset I is preferably greater than the thickness T of strap 104. Advantages of such a structure will be discussed below when describing operation of the cable tie.

Referring back to FIG. 1, strap 104 includes a first end which is fixedly attached to and bent closely adjacent a lower corner of locking head 102 at approximately a right angle to axis P. That is, the first end is formed with a right angle bend, which bend is essentially retained in a static non-use state. Strap 104 has a predefined thickness and further preferably includes standard gripping ridges 108 (see FIG. 3) on the outside surface of an angled and tapered second free end 112 of strap 104. Strap 104 may be provided with a longitudinally extending central groove 110 on the inside surface as shown in FIGS. 1–2. Central groove 110 may have an increased width, such as by providing a V-groove 120, near the first bent end as best shown in FIGS. 1–2.

As best shown in FIG. 3, strap accepting channel 122 divides the locking head 102 into a relatively thin first part (shown to the right of channel 122) that attaches to the first end of strap 104 and a second part (shown to the left of channel 122) that contains the locking device receiving cavity 180, and which receives a locking device 136. Cavity 180 is adjacent to and open toward the strap exit end 166 of the locking head to allow access for partial embedding of locking device 136 in a mounting slot 130 of end wall 124 to define a cantilever beam structure having a fixed end 134 and a free end 138 that extends into strap accepting cavity 122. Locking device receiving cavity 180 also allows for movement of locking device 136 during use. Mounting slot 130 may be preformed in an interior surface of cavity 180 or may be formed as a result of pressing an end 134 into the surface of endwall 124. An opening 132 may be provided between mounting slot 130 and interior wall portion 142.

This structure is useful in attaining a low profile cable tie due to several individual features. First, by orienting the strap accepting channel 122 as shown, the channel can be located tangential to the cable tie bundle being bound. Further, as the locking device is provided on the second part, the first part (which includes bottom wall 126) can be made thinner. This allows the strap when inserted through the strap accepting channel 122 to be closer to the cable bundle. While some minimum thickness is required for structural rigidity, it is possible to make bottom wall 126 the same thickness or even less than that of strap 104 (thickness T in FIG. 8). To further minimize the profile, the top outer surface 146 above the locking device 136 that forms a top of the cable tie head is preferably made to be thin and has no upwardly extending projections. This surface may extend above the locking device by a thickness that again can be less than the thickness of strap 104. The particular size of the strap may vary depending on application. When the locking device 136 is a metal locking device, the profile can be further reduced from the conventional two-piece design shown in FIGS. 9 and 10 by providing a bent locking device as shown in FIG. 3, with a fixed part 134 that is substantially parallel with the strap accepting channel. This minimizes the required height of the locking device receiving cavity 180 and thus assists in reducing overall cable tie head height. Further, by making the top surface smooth and free of upward extending openings, the cable tie is less likely to snag on, abrade or interfere with adjacent wires or cable ties. This can be further assisted by rounding the edges as shown.

Locking device 136 is preferably formed from a corrosion resistant metal, such as stainless steel, as known in the art. While locking device 136 may take a conventional straight form, it is preferably bent or formed so that free end 138 (mounted end) is at a predetermined angle relative to fixed end 134. This allows for a reduction in cable head height and thus achieves a lower profile head. Moreover, by providing a prebent locking device 136, easier insertion of locking device 136 into cavity 180 can be attained. In any case, free end 138 extends into the strap accepting channel at an acute angle relative to the axis of strap accepting channel 122 facing strap exit end 166 and the locking device 136 is provided on the second part of the locking head 102.

During non-use, cantilevered metal locking device 136 is located adjacent a fulcrum point defined by an upper edge of interior wall 142. Metal locking device 136 has a free length defined from the fulcrum point to free end 138 that allows free end 138 to extend into channel 122 by a distance to sufficiently engage strap 104 and prevent withdrawal of the strap from the channel.

Figure 5:
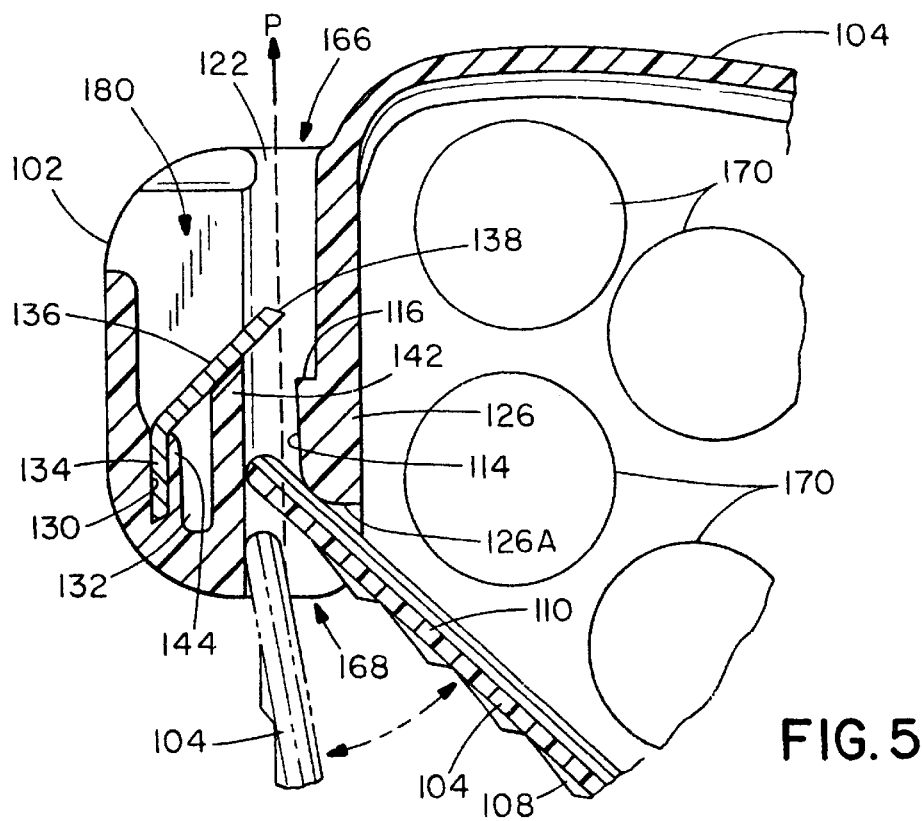
FIG. 5 is a cross-sectional view of the cable tie showing an initial feeding of the strap into a strap accepting channel.

Use of the inventive cable tie to bundle or wrap one or more cables 170 will be described with reference to FIGS. 5–7. FIG. 5 shows initial insertion of leading end 112 of strap 104 into leading end 168 of strap accepting channel 122. Due to the provision of the inset of an end surface 126A of bottom wall 126 by a distance I (best shown in FIG. 8), the leading end 112 of strap 104 can be inserted over a broad range of entrance angles. This facilitates easier positioning of leading end 112 within channel 122. Moreover, when strap 104 is inserted at steep angles relative to axis P, as illustrated by the rightmost strap in FIG. 5, the overhanging portion of inner wall 124 reliably receives and guides the leading end 112 into channel 122. This further assists in reliable operation of the cable tie.

Figure 6:
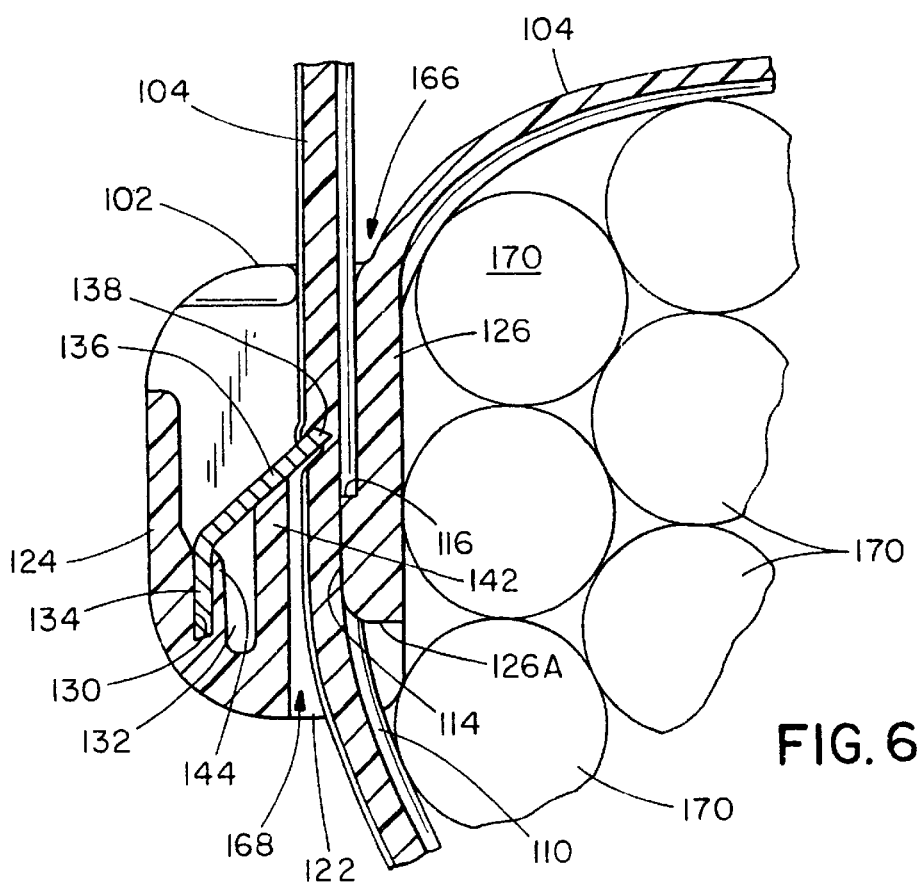
FIG. 6 is a cross-sectional view of the cable tie of FIG. 5 after the strap has been fully inserted and locked in place around a bundle of cables.
Figure 7:
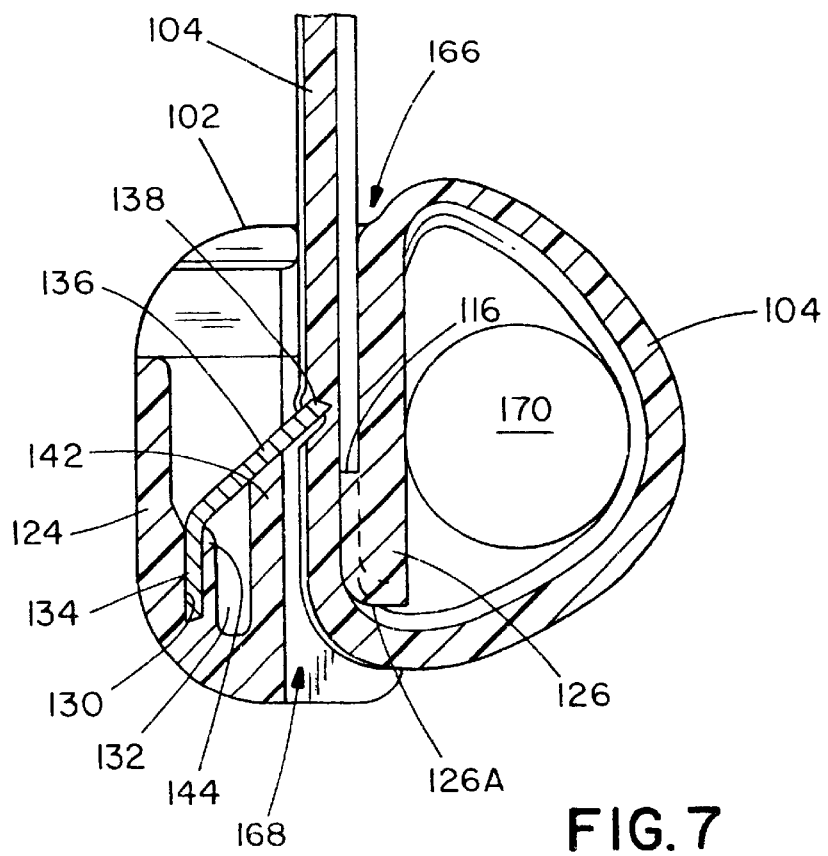
FIG. 7 is a cross-sectional view of the cable tie of FIG. 5 after the strap has been fully inserted and locked in place around a single cable.

Insertion continues from that shown in FIG. 5 to that shown in FIG. 6, where the strap 104 has passed metal locking device 136 and metal locking device 136 has begun biting into the strap to restrain the strap from removal. At this point in time, cable tie 100 is sufficiently tight around an object to be constrained, such as cable bundle 170. Strap 104 may be self-aligned in strap accepting channel 122 by the mating of central groove 110 around support guide 114 as shown. For this example, portions of leading end 112 extending beyond exit end 168 of locking head 102 have been shown cut and removed. However, the leading end may also be retained.

By provision of this inset I, the effective height or thickness of the channel entrance 168 can be increased without increasing total height of locking head 102 or making the remaining thickness or height of the channel much larger than the thickness of strap 104. This assists in achieving an overall low profile head design.

By locating the locking device 136 on the top side of the locking head (second part of the locking head opposite the first part that is secured to strap 104), the strap accepting channel 122 can be located closer to the bundle. Moreover, by use of a bent locking device, the second part of the locking head can have a reduced height, which further assists in achieving a low profile cable tie design.

While being able to accommodate a large bundle of cables 170, the inventive cable tie 100 is also able to accommodate a very small bundle, or even a single cable 170. This is shown in exemplary FIG. 7 where a single cable 170 is constrained by cable tie 100. Due to the bent first end of strap 100, flexing occurs at the bend and the strap can either expand to accommodate receiving a large cable bundle (as in FIG. 6) or can closely conform to the small cable 170 (as in FIG. 7). Moreover, by provision of inset I and the low profile head 102, free end 112 of the strap can be inserted to closely conform to cable 170. It is preferable for inset I to be the same or larger than the thickness of strap 104 so that the strap in use during the strapping of a very small bundle of cables may not stick out beyond the overall length of the cable tie locking head 102 as measured along the strap accepting channel axis. This achieves a cable tie structure which when in use can achieve a minimal peripheral profile compared to conventional two-piece cable ties such as that shown in FIG. 9. That is, the cable tie 100 does not extend much beyond the periphery of the cable (in width) due to the bent strap end, the inset I, and the strap accepting channel orientation, and does not extend much beyond the periphery of the cable (in height) due to the low profile head design, which is achieved by various combinations of the strap accepting channel orientation, the thin first part of the locking head, and a bent metal locking device.

While the systems of the invention have been described in conjunction with the specific embodiments outlined above, it is evident that many alternatives, modifications and variations will be apparent to those skilled in the art. Accordingly, the exemplary embodiments are intended to be illustrative, not limiting. Various changes may be made without departing from the spirit and scope of the invention.

What is claimed is:

1. A method of forming a low profile cable tie, comprising the steps of:

molding a cable tie strap with a predetermined thickness, the strap having a first end with a substantially right angle bend in a non-use state and a free end;

molding a locking head secured to the first end of the strap, the locking head including a strap accepting channel having a strap entry and a strap exit end aligned along a strap accepting channel axis, the strap accepting channel dividing the locking head into a first part and a second part, the first part of the locking head being secured to the first end of the strap along a strap attachment axis which is substantially parallel with the strap accepting channel axis, the locking head further including a locking device receiving cavity located in the second part of the locking head adjacent to and open toward the strap exit end of the locking head;

forming a locking device with a fixable end and a free end that is angled at a predetermined acute angle relative to the fixed end; and providing the locking device in the locking device receiving cavity of the second part of the locking head so that the free end of the locking device extends into the strap accepting channel and the fixable end is securely fixed to the second part.

2. The method of claim 1, wherein the locking device is formed from metal.

3. The method of claim 2, wherein the step of providing the locking device in the locking device receiving cavity orients the fixable end to be substantially parallel to the strap accepting channel axis.

4. The method of claim 1, wherein the second part has an overall length in the strap accepting axis and the first part comprises a bottom wall formed to have a length shorter than the overall length of the second part such that an end surface of the bottom wall adjacent the strap accepting channel entrance is inset from a corresponding end surface of the second part to increase the effective opening height of the strap accepting channel and allow strap entrance over a large range of entrance angles.

5. The method of claim 4, wherein the inset is formed to be at least the thickness of the strap.

6. The method of claim 1, wherein a top surface of the locking head is provided immediately adjacent the locking device and formed with a thickness extending above the locking device that is no more than the thickness of the strap and where the first part is formed with a thickness that is no more than the thickness of the strap.

7. The method of claim 6, wherein the top surface of the locking head has no upwardly extending projections.

* * * * *